July 22, 1969    P. THORDARSON    3,456,509
PORE PRESSURE
Filed June 5, 1967

INVENTOR.
Petur Thordarson
BY
TW Seivest
ATTORNEY

United States Patent Office 3,456,509
Patented July 22, 1969

3,456,509
PORE PRESSURE
Petur Thordarson, 2122 N. 88th St.
Seattle, Wash. 98103
Filed June 5, 1967, Ser. No. 643,584
Claims priority, application Norway, June 20, 1966,
163,536
Int. Cl. G01l 7/08
U.S. Cl. 73—406
4 Claims

ABSTRACT OF THE DISCLOSURE

An instrument for measuring pore pressure of the earth. The instrument is placed in the ground or an earth structure; and, at various times, the pores pressure at that locality in the ground or the earth structure can be determined. By maintaining records on the pore pressure, it is possible to determine if the pore pressure is varying or is remaining substantially the same. The instrument comprises means responsive to the pore pressure and means for measuring the pore pressure.

---

Figure 1:
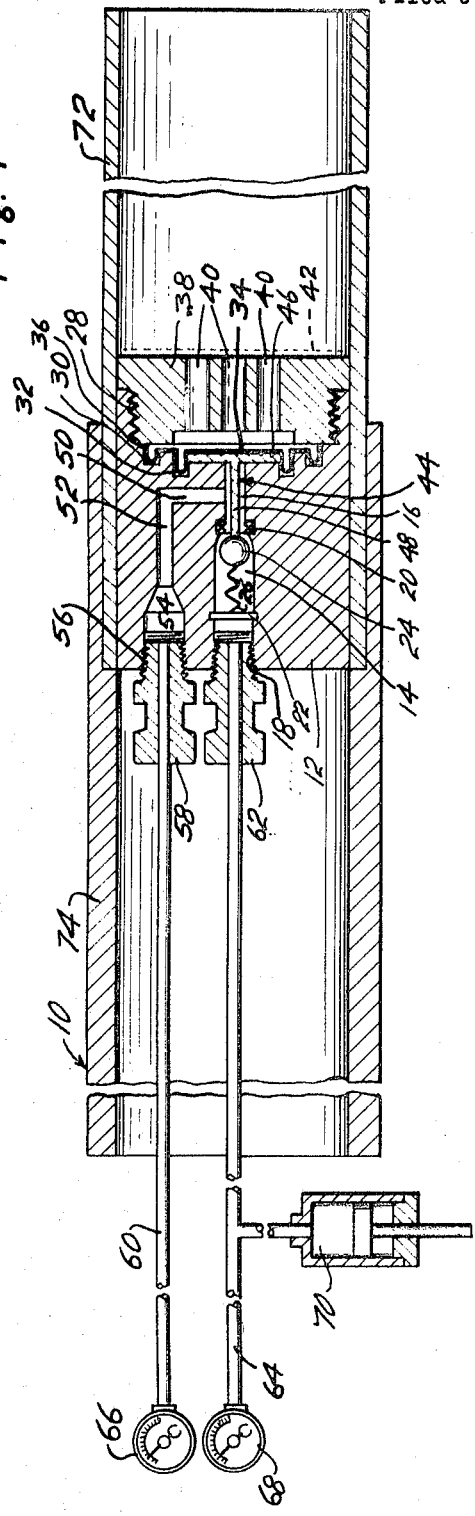

The pore pressure of the ground and of earthen structures varies with water content. At various times of the year, the pore pressure may become quite large and at other times may become quite small. When the pore pressure becomes large, there is the possibility of slides and which slides can cause considerable damage. For example, at Abernath, England, the pore pressure in the slag pile became quite high and the slag pile moved and damaged a school building and other buildings and killed a number of children. To preclude the damage to life, and also, maybe, the damage to physical property, it is desirable to know the pore pressure in the ground and the earthen structure. Accordingly, it is desirable to have a reliable instrument for reading the pore pressure. An object of this invention is to provide an instrument for measuring pore pressure and which instrument is reliable; to provide an instrument which is easy to operate; to provide a system which operates on fluid pressure such as gas or on air; to provide an instrument whereby there is a negligble time lag for increasing the fluid pressure and measuring the pore pressure; to provide an instrument which can be mounted vertically so that there is no water displacement problems; to provide an instrument which is portable and the reading apparatus is also portable; to provide an instrument which is low in cost and the installation may be low in cost; and, to provide an instrument which does not require the degassing or the deairing of the system.

These and other important objects and advantages of the invention will be more particularly brought forth upon reference to the accompanying drawing, the detailed description of the invention and the appended claims.

Figure 2:
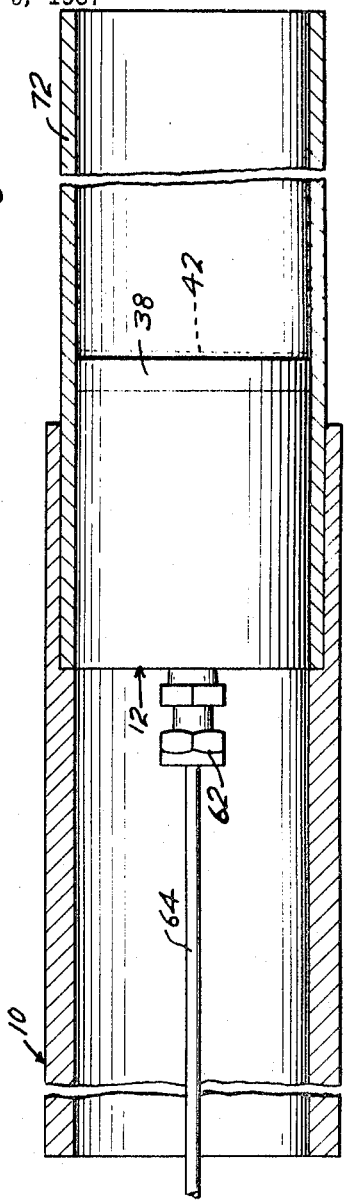

In the drawing:

FIGURE 1 is a longitudinal cross-sectional view illustrating the pore pressure measuring instrument and the manner of assembling the various parts of this instrument; and FIGURE 2 is a fragmentary longitudinal cross-sectional view illustrating the pore pressure measuring instrument.

The invention, the pore pressure measuring instrument, is identified by reference numeral 10. The instrument comprises a right circular cylindrical body member 12. In the body member 12, there is a longitudinal passageway having an enlarged part 14 and a narrow part 16. The outer end of the enlarged part 14 is internally tapped at 18. At the junction of the enlarged part 14 and the restricted part 16, there is a valve seat 20. This valve seat 20 is a quad ring. In the enlarged part 14 and near the outer end, there is a pin 22. Also, in the enlarged part 14 there is a sphere or ball 24. A spring 26 bears against the pin 22 and, also, against the sphere 24 so as to urge the sphere 24 against the valve seat 20. As is seen in FIGURE 1, the right end of the body 12 is recessed and internally tapped at 28. Also, the outer face of the body 12, the right outer face, there is recessed at 30, in the form of a large circular recess, and is recessed at 32, in the form of a small circular recess. A diaphragm covers the inner part of the right outer face of the body 12. This diaphragm is identified by reference numeral 34 and its outer circular edge 36 is adhered by the form of a resin or an adhesive to the outer wall of the right circular groove 30. A plug 38 is screwed into the end of the body 12. The plug 38 has a number of longitudinal passageways 40 so as to allow a fluid such as water to flow through the passageway 40 and bears against the diaphragm 34. On the outer end of the plug 30 there may be positioned a filter 42. The filter 42 may be a screen and the like.

A plunger 44 connects with the diaphragm 34, and on that face of the diaphragm facing the body 12. The plunger 44 has a circular base 46 and a shank 48. The shank 48 is sufficiently long to contact the sphere or ball 24 when the diaphragm 34 moves toward the body 12.

In the body 12 there is a radial passageway 50. The radial passageway 50 connects with the similar passageway 16. Longitudinal passageway connects with the radial passageway 50. The outer end of the longitudinal passageway 52 connects with a recessed passageway 54. The outer end of the recessed passageway 54 is internally tapped at 56. A pipe-to-tube fitting 58 is screwed into the internally tapped passageway 56. The pipe-to-tube fitting 58 connects with a small diameter pipe 60.

A pipe-to-tube fitting 62 screws into the internally tapped passageway 18. The pipe-to-tube fitting 62 connects with a small diameter tube 64.

The tube 60 connects with a gauge 66. The tube 64 also connects with a gauge 68 and connects with a source of pressure 70. The source of pressure 70 may be a small hand pump for pumping a fluid such as gas into the tube 64 and into the enlarged passageway 14 and the small passageway 16. Or the source of pressure 70 may be a gas under pressure such as nitrogen under pressure and in a pressure cylinder.

It is seen that, on the end of the body member 12 and the plug 38, there is a cylindrical housing 72. The cylindrical housing 72 may be adhered to the body 12 and the plug 38 by means of a resin or an adhesive. Also, there is a cylindrical housing (not shown) which surrounds that portion of the housing 72 surrounding the body 12. Also, the housing surrounds the fittings 58 and 62 and part of the tubes 60 and 64.

The materials of construction of the pore pressure instrument may be plastic. For example, all of the materials of construction may be plastic, except the plunger 44, the source of fluid pressure 70, the gauges 66 and 68. The manufacture of most of the components of plastic, considerably lessens the possibility of corrosion of the pore pressure instrument 10 and the non-working of the various components of the pore pressure instrument 10. As a result, the pore pressure instrument 10 is more reliable.

In operation, the pore pressure instrument 10 is buried in the ground or earth structure. For example, it may be desired to know the pore pressure at a depth of 1,000 feet or at a depth of 50 feet. A hole is bored into the ground, or into the earth structure, and some loose porous material such as sand is poured into the hole for a depth of a foot or two. Then the pore pressure instrument is positioned in the hole and covered with sand. Then the hole may be filled in so as to bury the pore pressure instrument 10. As the pressure builds in the earth, the diaphragm 34 is moved with the resulting movement of the shank 48 of the plunger 44. This unseats the sphere 24 of the check valve. When it is desired to read the pore pressure, the source of pressure 70 and the gauge 68 are connected to the tube 64. Also, the gauge 66 is connected to the tube 60. The pressure in the tube 64, the passageways 14 and 16, and 52, and the tube 60 is increased from the source of the pressure 70. When the pressure in the tube 64 and the passageway 14 is equal to or greater than the pore pressure, the sphere 24 contacts the valve seat or quad ring 20 so as to close the valve and prevent the flow of fluid into the passageways 50 and 52 and the tube 60 and the gauge 66. At this time the reading of the gauge 66 remains constant while the reading on the gauge 68 increases. From the reading of these two gauges, and when the readings on the two gauges differ, then it is possible to tell the pore pressure by means of the reading on the gauge 66.

By maintaining records from various readings on the pore pressure, it is possible to determine when there is an abnormal build-up of pore pressure and possible slide danger conditions.

In an installation there are usually numerous pore pressure instruments so as to determine the pore pressure at various locations. The reading equipment, consisting of the source of fluid pressure 70 and the gauges 66 and 68 may be moved from one pore pressure instrument to the other to take readings.

From the foregoing it is seen that I have provided an inexpensive and easy-to-operate instrument for determining the pore pressure in the ground and in earthen structures.

What I claim is:

1. A pore pressure measuring instrument, said instrument comprising:
    (a) a body,
    (b) passageway means in said body,
    (c) a source of fluid pressure connected to said passageway means,
    (d) pressure indicating means connected to said passageway means,
    (e) valve means in said passageway means intermediate said source of fluid pressure and said pressure indicating means,
    (f) a pore pressure responsive means operatively connected to said valve means and biasing said valve means open with a force equal to the pore pressure, and
    (g) the pressure at said pressure indicating means being applied to said pore pressure responsive means in opposition to said pore pressure;
whereby fluid pressure from the source is applied to the valve means until it exceeds the pore pressure, closing the valve, whereupon the pressure in the indicating means is indicative of the pore pressure.

2. A pore pressure measuring instrument according to claim 1 wherein:
    (a) said valve means is a check valve consisting of a sphere and valve seat,
    (b) said pore pressure responsive means comprises a diaphragm connected to a source of pore pressure and a plunger connected to said diaphragm and said check valve, whereby pore pressure on the diaphragm opens the check valve.

3. A pore pressure measuring instrument, said instrument comprising:
    (a) valve means,
    (b) means responsive to pore pressure biasing said valve means open,
    (c) variable fluid presure source means operatively connected with said valve means and applying a pressure against said pore pressure responsive means opposed to the pore pressure, and
    (d) means for indicating the pressure required from the fluid source means against the means responsive to the pore pressure to close the valve means;
whereby an increase in said fluid presure from the source means will be indicated on the indicating means until the valve means closes, thereby balancing the pressure in said indicating means with the pore pressure and producing an indication in the indicating means of the pore pressure.

4. A pore pressure measuring instrument according to claim 3 wherein:
    (a) said valve means comprises a sphere and valve seat, and
    (b) said pore pressure responsive means comprises a diaphragm connected to said sphere where by pore pressure on said diaphragm tends to unseat said sphere of the valve seat.

References Cited

UNITED STATES PATENTS

| | | | |
|---|---|---|---|
| 3,088,485 | 5/1963 | Hanssen | 137—85 |
| 3,318,140 | 5/1967 | Shields | 73—73 |

LOUIS R. PRINCE, Primary Examiner

D. E. CORR, Assistant Examiner

U.S. Cl. X.R.

73—73